3,192,326
CUSHIONED SUPPORT FOR HEADSET
Zeph S. Chapman, 1106 Orange Grove,
San Fernando, Calif.
Filed May 26, 1961, Ser. No. 113,027
3 Claims. (Cl. 179—178)

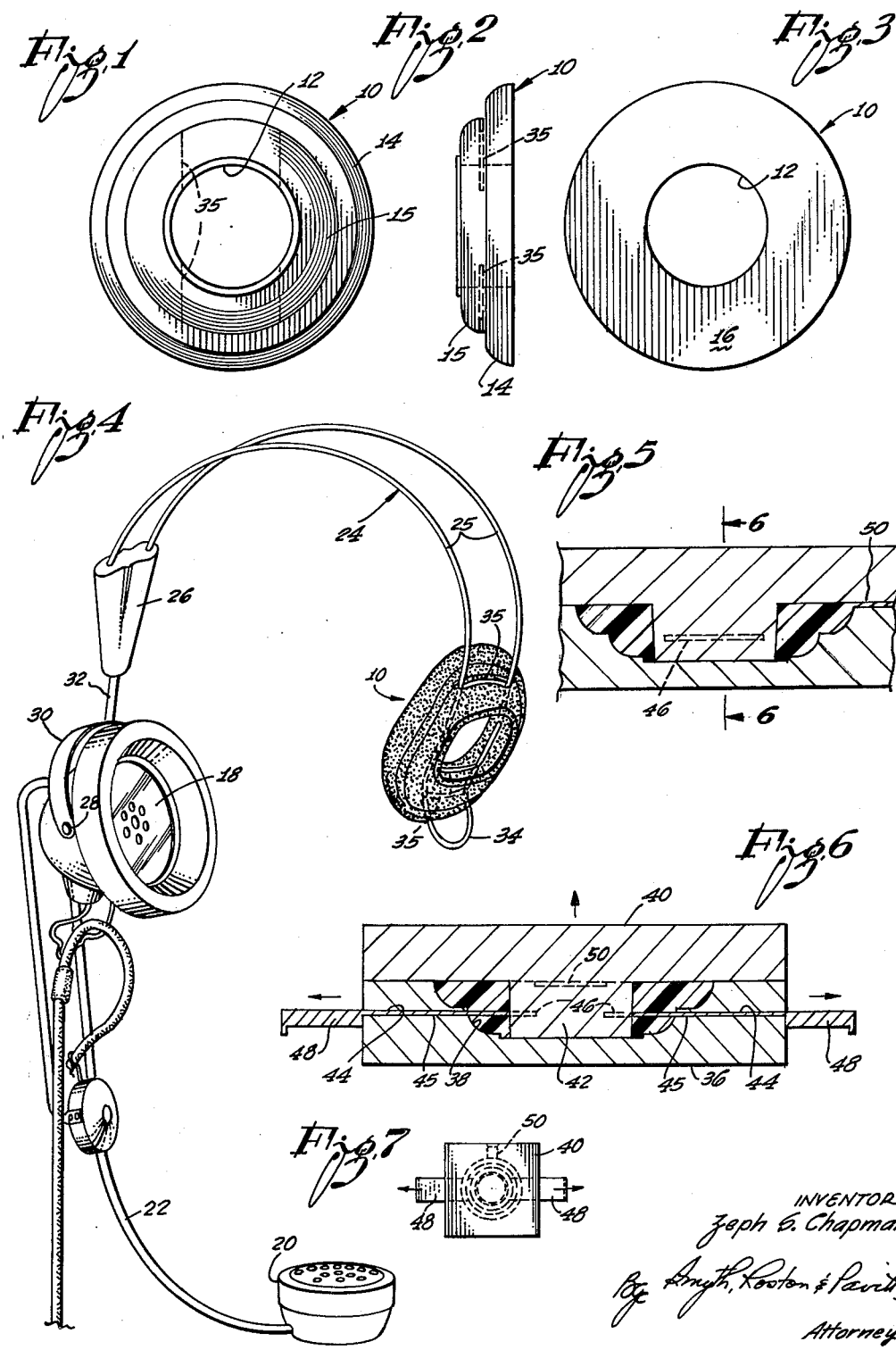

This invention relates to a switchboard operator's headset and, more particularly, relates to a cushioned support for such a headset.

A switchboard operator's headset comprises an earphone for positioning at one ear of the operator, a mouthpiece or microphone connected to the earphone by a support arm for positioning near the operator's lips, and an elongated spring-like holder that curves across the top of the operator's head, the earphone being mounted on one end of the curved holder.

The curved holder is typically made of a length of polished spring wire that is easy to clean, the wire being looped to form two laterally spaced longitudinal portions. At one end of the holder the two longitudinal portions of the wire terminate in a plastic fitting that carries the earphone, the second end of the holder being formed by a bend or loop of the wire.

The curved holder necessarily grips the operator's head to serve its purpose of effectively holding the earphone against the operator's ear and, naturally, the gripping pressure is of relatively great magnitude at the second end of the holder. To reduce discomfort and avoid concentrating the pressure at the end of the loop, the looped end of the holder is bent outward away from the operator's head. The pressure is still concentrated, however, since the two spaced wires afford exceedingly small areas of contact with the operator's head.

It is highly desirable to provide a cushion at or near the looped end of the curved holder to distribute the clamping pressure for the comfort of the holder. Certain requirements, however, must be met in any attempt to provide such a cushion and the broad purpose of the present invention is to meet these requirements.

The basic requirement is, of course, to provide a cushion of such area as to reduce drastically the pressure per unit area against the operator's head. A second requirement is to provide a cushion that is soft and yieldable to conform with whatever area of the operator's head it covers and to distribute the pressure over that area. Another requirement is to provide a cushion, which, like the wire holder, is of open construction for adequate ventilation to avoid confining heat and to avoid promoting local perspiration. Still another requirement is that the cushion, like the wire holder, be sanitary and easy to clean. A further requirement is that the cushion be adjustable along the holder since the desired location of the pressure area is a matter of personal preference and varies among operators. Finally, such a cushion should be inexpensive, yet at the same time durable for a long service life.

The invention meets these numerous specific requirements by providing a cushion comprising a body of soft cellular elastomer capable of conforming easily with the local contour of a telephone operator's head. To meet the requirement for ventilation and at the same time to provide an effective area of contact, the body of elastomer has a central opening to make it ring-shaped. Sanitation is achieved by molding the cellular elastomer body with an integral skin that covers all of its surfaces and seals off the cells adjacent all of the surfaces. To make the holder adjustable in an effective but inexpensive manner, it is apertured or slitted diametrically to receive the looped end of the curved wire holder in a sliding manner.

The slitted construction creates a problem of how to form the slits without creating dirt-catching open-cell surfaces. This problem is solved by molding the slitted configuration instead of cutting a molded body to form the slits. In this regard a feature of the invention is the use of a mold with a ring-shaped cavity and with a pair of thin blades extending radially across the cavity on one diameter, the blades being retractible radially outward. The presence of the blades in the mold forms the slits in the cellular elastomer body and in doing so forms a sealing skin over the inner surfaces of the slits.

The features and advantages of the invention may be understood from the following detailed description and the accompanying drawing.

In the drawing, which is to be regarded as merely illustrative:

FIG. 1 is a plan view of the presently preferred embodiment of the headset cushion;

FIG. 2 is a side elevation showing the cushion in profile;

FIG. 3 is a bottom plan view of the cushion;

FIG. 4 is a perspective view of a typical switchboard operator's headset equipped with the presently preferred embodiment of the cushion;

FIG. 5 is a fragmentary axial section of a mold for forming the cushion;

FIG. 6 is a similar section taken at right angles to the first section, as indicated by the line 6—6 of FIG. 5; and FIG. 7 is a plan view of the mold on a reduced scale.

FIGS. 1–3 illustrating the presently preferred embodiment of the invention show a cushion for the purpose of the invention in the form of a body, generally designated by numeral 10, made of a foamed or cellular elastomer. For example, the material may be vinyl foam. A suitable blowing or foaming agent may be used and a suitable plasticizer such as "G–62" sold by Rohm & Haas of Philadelphia, Pennsylvania.

As seen in plan in FIGS. 1 and 3 the body 10 is a cellular body with a relatively large axial opening 12 which makes the body ring-shaped in plan. In profile, as may be seen in FIG. 2, the body 10 is of hat-shaped configuration with a base portion 14 and a crown portion 15. The bottom face 16 is preferably planar.

FIG. 4 shows a typical switchboard operator's headset on which the support cushion of the invention is to be employed. The purpose of the headset is to support an earphone 18 at one of the ears of the operator and to support a microphone or telephone mouthpiece 20 in the region of the operator's lips. For this purpose the microphone 20 is supported from the earphone 18 by a curved support arm 22 and the microphone, in turn, is supported by a spring-like holder, generally designated 24, that is curved to fit over an operator's head.

In the construction shown, the holder 24 comprises a piece of wire which is doubled back on itself to form two spaced longitudinal portions 25. At one end of the holder 24, the two ends of the wire are embedded in a plastic body 26. The earphone 18 has a pair of trunnions 28 by means of which it is pivotally supported in a yoke 30. The yoke 30 has a shank 32 which is embedded in the plastic body 26. The second end of the holder 24 is in the form of a loop 34 and the loop is bent outward as may be seen in FIG. 4.

A feature of the invention is the concept of simply laterally aperturing the foamed elastomer body 10 to permit the body to receive the looped end of the holder 24 in a slidingly adjustable manner. For this purpose the body 10 is formed with two slits that are indicated at 35 in FIGS. 1, 2 and 3. The two slits are symmetrical to a diameter of the ring-shaped cushion, each slit extending radially through the ring-shaped cushion. Preferably, but not necessarily, the two slits 25 are in the crown portion 15 of the cushion body. As may be seen in FIGS. 1 and 4, the two slits are as wide as the spring-like holder 24.

It is contemplated that substantially the entire surface of the cushion body 10, including the interior surfaces of the slits 35 will be covered with an integral skin that completely seals all of the surface cells. Such a skin may be formed by molding since a molding operation results in a skin surface wherever the elastomer touches the wall of the mold cavity. The problem arises, however, of forming the desired skin surface inside the two slits 35. The mold shown in FIGS. 5-7 solves this problem.

The mold shown in FIGS. 5-7 comprises a lower mold member 36 with a circular cavity 38 and an upper mold member 40 that closes the cavity. The cavity 38 is of the desired hat-shaped configuration in diametrical section and the upper mold member 40 has a solid cylindrical projection 42 which extends into the lower mold member 36 to make the cavity 38 of the desired ring-shaped configuration.

For the purpose of forming the two slits 25, the lower mold body 36 is formed with radial slots 44 in which a pair of thin blades 45 are slidingly mounted. The solid cylindrical projection 42 of the upper mold member 40 is formed with similar radial slots 46 to receive the inner ends of the thin blades. In the construction shown, each of the blades 45 is enlarged at its outer end to form a handle 48 that abuts against the periphery of the lower mold member 36 when the blade is fully inserted.

In the construction shown, the blades 45 are substantially thinner than the wire of the spring-like holder 24 so that each of the slits 35 of a cushion body 10 will have an unrestrained configuration thinner than the thickness of the spring-like holder 24. Consequently the cushion body 10 will frictionally grip the spring-like holder 24 to tend to remain at whatever position to which it may be adjusted.

The manner in which the invention serves its purpose may be readily understood from the foregoing description. To produce a cushion body 10, the two mold members 36 and 40 are closed together and then the two thin blades 45 are inserted into the radial slots 44 of a lower mold member 36 and into the corresponding radial slots 46 of the solid cylindrical projection 42 of the upper mold member 40. The uncured foam plastic is injected into the mold cavity through a radial passage 50.

After the molded foamed elastomer is cured, the two thin blades 45 are retracted radially from the mold cavity 38 and the upper mold member 40 is removed for access to the molded product. To put the cushion body 10 into service, the loop end of the spring-like holder 24 is inserted through the two radial slits 35 as shown in FIG. 4. The cushion body 10 may then be slid along the holder 24 to whatever position suits the switchboard operator.

Since the cushion body 10 is of relatively soft cellular construction it readily conforms to the local contour of the operator's head and effectively distributes the pressure for maximum comfort. Since all of the surface cells are sealed it is readily washable. The ring-shaped configuration provides adequate ventilation. The cushion body may be produced economically since the production procedure consists of a single molding step.

My description in specific detail of the preferred practice of the invention will suggest various changes, substitutions and other departures from my disclosure within the spirit and scope of the appended claims.

I claim:

1. A cushion for mounting on a switchboard operator's headset wherein a spring-like holder curved to fit over an operator's head carries an earphone on one of its ends to be held thereby against one of the operator's ears, said cushion comprising:

a soft, resilient, foamed plastic body of circular configuration with a diametrical passage therethrough to receive and slidingly grip the other end of the holder for sliding adjustment along the holder to suit the operator's comfort, said passage being substantially parallel with the inner face of the body, the entire surface of the body, including the inner surfaces of the passage, being covered with an integral skin closing the outer cells of the foamed plastic to discourage the accumulation of dust and other foreign material on the body.

2. A cushion for mounting on a switchboard operator's headset wherein a spring-like holder curved to fit over an operator's head carries an earphone on one of its ends to be held thereby against one of the operator's ears, said cushion comprising:

a soft, resilient, foamed plastic body of ring-shaped configuration in plan with two diametrically aligned radial passages therethrough to receive and slidingly grip the other end of the holder for sliding adjustment along the holder to suit the operator's comfort, the entire surface of the body including the inner surfaces of the two radial passages being covered with an integral skin closing the outer cells of the foamed plastic to discourage the accumulation of dust and other foreign material on the body.

3. A cushion for mounting on a switchboard operator's headset wherein a spring-like holder curved to fit over an operator's head carries an earphone on one of its ends to be held thereby against one of the operator's ears, said cushion comprising:

a soft resilient, foamed plastic body of ring-shaped configuration in plan with an axially inward base portion of relatively large diameter and an axially outer portion of less diameter, said body having two diametrically aligned radial passages therethrough near the juncture of the two portions to receive and slidingly grip the other end of the holder for sliding adjustment along the holder to suit the operator's comfort, the entire surface of the body including the inner surfaces of the two radial passages being covered with an integral skin closing the outer cells of the foamed plastic to discourage the accumulation of dust and other foreign material on the body.

References Cited by the Examiner

UNITED STATES PATENTS

| | | | |
|---|---|---|---|
| 1,484,731 | 2/24 | Malm | 18—53 |
| 1,578,642 | 3/26 | Clarke | 179—156 |
| 1,590,765 | 6/26 | Linder | 18—53 |
| 2,149,341 | 3/39 | Harrison | 179—156 |
| 2,337,953 | 12/43 | Wirsching | 179—156 |
| 2,686,231 | 8/54 | Stevens | 179—156 |

ROBERT H. ROSE, *Primary Examiner.*

WALTER L. LYNDE, *Examiner.*